United States Patent [19]
Rose

[11] 3,918,876

[45] Nov. 11, 1975

[54] APPARATUS FOR BLOW-MOULDING HOLLOW BODIES

[75] Inventor: Peter Rose, Henstedt-Ulzburg, Germany

[73] Assignee: Heidenreich & Harbeck Zweingniederlassung der Gildemeister AG, Germany

[22] Filed: Mar. 25, 1974

[21] Appl. No.: 454,664

[30] Foreign Application Priority Data
Apr. 3, 1973   Germany............................ 2316593

[52] U.S. Cl................................. 425/389; 425/390
[51] Int. Cl.²......................................... B29D 23/03
[58] Field of Search............. 425/389, 390, DIG. 14

[56] References Cited
UNITED STATES PATENTS
3,032,823   5/1962   Sherman.......................... 425/389 X
3,816,046   6/1974   Farrell ............................. 425/389 X Primary Examiner—Francis S. Husar
Assistant Examiner—1
Attorney, Agent, or Firm—Cullen, Settle, Sloman & Cantor

[57] ABSTRACT

Blow-moulding apparatus for blow-moulding elongated blanks of preheated thermoplastic material by; the use of a resilient bellows located upon a mandrel. The wall thickness of the bellows radially increases toward the bellows' closed end wherein initial expansion of the bellows and parison is in an elongated direction prior to significant radial expansion, and the interior of the parison is vented to insure complete contact between the bellows and parison.

1 Claim, 1 Drawing Figure

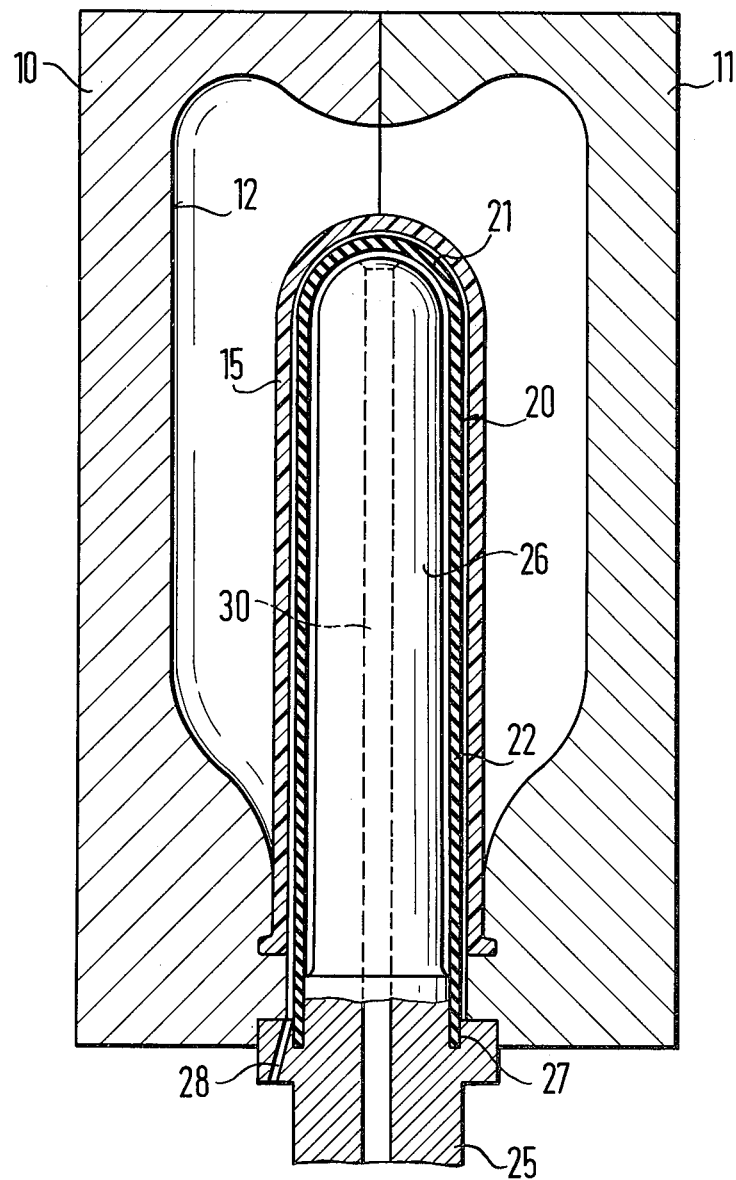

APPARATUS FOR BLOW-MOULDING HOLLOW BODIES

The present invention relates to an apparatus for blow-moulding hollow bodies, in particular bottles, from a preheated parison made of thermoplastic material.

It is known in blow-moulding hollow bodies, in particular bottles, to injection-mould a parison of a thermoplastic material having a closed bottom or to produce a parison from a tube member having a welded bottom, to pre-heat said parison in a heating station and to widen it subsequently in a blow-mould to assume a desired shape. In order to achieve a controlled wall thickness of the finished hollow body when widening it, it is further known to either more or less pre-heat in the heating station certain longitudinal zones of the parison in order to attain a predetermined distribution in temperature in longitudinal direction of the parison, so that during the blow-moulding process the wall thickness of the parison is controlled in accordance with expanding the parison to the desired bottle shape.

To ensure a better control of the wall thickness of the parison during the blow-moulding process, it had already been suggested to provide the heating means with a control means; however, in view of the high accuracy required in operation, said control means is relatively expensive and complicated.

If, however, the control means is not operating precisely enough, the blow mould step often results in misshaped, cracked hollow bodies or such having an irregular wall thickness since, during blow-moulding, the stretching process is solely determined by the thermoelastic deformability of the differently heated zones of the parison. Moreover, variations in the module of elasticity at free inflation of a pre-heated parison assuming a bottle shape are of particular negative influence.

An object of the invention, therefore, is to indicate a method by which the parisons can be widened to a desired hollow body having a specifically controlled wall thickness without using an expensive heating device provided with control means.

Said object is solved in that a resilient bellows is disposed within the parison and that the widening medium is supplied to the bellows.

The method according to the invention renders possible that the thermoelastic stretching process is no longer dependent upon the different heating of the parison in the heating means corresponding to the desired wall thickness distribution of the hollow body, but, rather that the thermoelastic stretching process is exclusively determined by the elastic properties of the flexible bellows within the parison. The advantage of the invention resides in that only the thermoplastic parison has to be pre-heated to a pre-determined deforming temperature. Variations in temperature and in the thermoelastic stretching behaviour of the parison do no longer affect the blow-moulding process, since widening of the parison to a hollow body, in particular a bottle, is now solely determined by the elastic behaviour of the flexible bellows.

After insertion of the elastic bellows in the parison heated to an equal temperature throughout and upon supplying the widening medium into the bellows, the parison is, so to say, riding on the elastic bellows and follows the stretching movement of said bellows, since the bellows inflated has a more stable characteristic of resiliency than the pre-heated parison. Thus, the widening process of the parison is determined by the elastic properties of the flexible bellows.

Another object of the invention is to vary the elasticity of the flexible bellows corresponding to the wall thickness distribution of the hollow body to be blow-moulded. In particular in its longitudinal direction the flexible bellows is provided with a differing wall thickness. Accordingly, the stretching process may be controlled such that, for instance, initially a longitudinal stretching and subsequently a radial expansion takes place.

According to another object of the invention, the configuration of the flexible bellows approximately coincides with the shape of the parison. Said bellows has to be easily placed into the parison; therefore, the outer diameter of the bellows has to be smaller than the inner diameter of the parison.

In an preferred embodiment said flexible bellows is made up of rubber or any rubber-elastic material, in particular plastic material.

Another object of the present invention is to use a liquid as widening medium. By using a non-compressible widening medium for the blow-moulding process, a further advantage is attained in that the widening medium due to the flexible bellows is not contacting the hollow body, and that - when using cold or slightly heated oil or water as widening medium - the usually long-lasting annealing and cooling process, respectively, with hollow bodies of plastic material can be accelerated.

Furthermore, the widening process by means of the elastic bellows can ensue relatively quickly, since the stretching process, if a bottle shape is to be attained, is determined only by the flexible bellows which is supported over the finished hollow body on the blow mould when the widening process ends.

When the cooling step comes to an end, the flexible bellows shrinks back to its original shape upon removal of the widening medium, so that the bellows is again ready to be inserted into a new parison.

In the blow-moulding process also inflated air can be used instead of a liquid.

The invention is explained with reference to the single FIGURE shown in the drawing, which is a sectional view of a blow mould.

The parison 15 has to be brought into contact with the inner contour 12 of the two blow-mould sections 10 and 11. Around its open end the parison 15 is held by said blow mould sections 10 and 11. A bellows 20 is placed within the parison 15, which bellows consists of a rubber-elastic material, and has a wall thickness which is different in certain areas corresponding to the ratio of stretching the parison into bottle shape.

Particularly the bottom zone 21 of the flexible bellows 20 is thicker than the neck zone 22, thus enabling regulation of the wall thickness. The elastic bellows 20 is vulcanized at 27 into a metal body 25 which forms a unit with the mandrel 26. In order to support the bellows, said mandrel 26 extends upwardly to the bottom zone 21 of the bellows. In the area of the vulcanized zone 27 venting bores 28 are provided so that the air may be exhausted between the bellows and the parison during the moulding process.

The longitudinal bore 30 of the mandrel 26 is connected with a pressure source for the widening medium.

For equal distribution of the widening medium into the space between the mandrel and the bellows, said mandrel 26 may be provided with radial and longitudinal grooves connected to the bore 30, which grooves are not shown.

When the blow-moulding process is finished, the bellows may, perhaps by means of a vacuum, again be contracted for a short period of time. In order to prevent adherence, an air gap is likewise provided between the mandrel and the bellows.

What we claim is:

1. Apparatus for blow-moulding preheated parisons of thermoplastic material comprising, in combination, a mold defining an elongated cavity having a closed end and a mandrel receiving end, an elongated mandrel extending into said mold cavity through said mandrel receiving end, said mandrel having an inner end disposed adjacent the cavity closed end, an outer end adjacent said cavity mandrel receiving end and an exterior surface, a passage longitudinally extending through said mandrel intersecting said inner end, an elongated elastic tubular rubber bellows encompassing said mandrel within said mold cavity having an inner closed end adjacent said mandrel inner end and a sealed end sealed to said mandrel outer end, said bellows having a variable radial wall thickness increasing in thickness from said sealed end toward said bellows' inner closed end whereby inflation of said bellows by a pressurized medium entering said passage causes said bellows to initially longitudinally extend toward said cavity closed end prior to significant radial bellows expansion occurring, means for mounting an elongated heated parison of thermoplastic material within said mold cavity encompassing said bellows whereby inflation of said bellows initially elongates said parison prior to significant radial expansion thereof within said cavity, and a vent passage defined in said mandrel and positioned so as to be communicable with the interior of a parison placed thereon and with the atmosphere to vent the interior of said parison during expansion thereof by said bellows.

* * * * *